Inventors
Alfred Neukom
Rolf Schaal
by Michael S. Striker
Atty.

June 22, 1965 A. NEUKOM ETAL 3,191,001
RESISTANCE WELDING MACHINE
Filed Nov. 6, 1962 3 Sheets-Sheet 2

Inventors
Alfred Neukom
Rolf Schaal
by Michael S. Striker
Atty.

June 22, 1965 A. NEUKOM ETAL 3,191,001
RESISTANCE WELDING MACHINE
Filed Nov. 6, 1962 3 Sheets-Sheet 3

INVENTORS:
ALFRED NEUKOM
ROLF SCHAAL
BY
Michael S. Striker
ATTORNEY

United States Patent Office 3,191,001
Patented June 22, 1965

3,191,001
RESISTANCE WELDING MACHINE
Alfred Neukom, Dubendorf, and Rolf Schaal, Schlieren, Switzerland, assignors to H. A. Schlatter A.G., Zollikon, Zurich, Switzerland
Filed Nov. 6, 1962, Ser. No. 235,619
Claims priority, application Switzerland, Nov. 7, 1961, 12,968/61
5 Claims. (Cl. 219—101)

The present invention relates to resistance welding machines in general, and more particularly to a flash or butt welding machine which is especially suited for forming welded joints between large and comparatively heavy sections of workpieces with or without preheating. In such machines, the butt-ended sections of workpieces must be subjected to substantial upsetting presusres.

Many conventional flash or butt welding machines are provided with two clamping or work holding mechanisms with one thereof movable in the direction of feed, such direction normally coinciding with the direction in which upsetting pressure is applied to the butt-ended sections. As a rule, the movable clamping mechanism assumes the form of a carriage which is reciprocable along the base or bed of the welding machine. Consequently, the base is subjected to substantial bending stresses and its guideways for the carriage must withstand all such forces which tend to tilt the carriage during the application of upsetting pressures. If the upsetting pressures are large (such pressures may reach and often exceed 35,000 p.s.i.), the base and the carriage must be of exceedingly bulky construction.

Accordingly, it is an important object of the present invention to provide an improved flash or butt welding machine which is constructed and assembled in such a way that the upsetting pressures cannot subject the guide means for the movable clamping mechanism to any appreciable bending stresses.

Another objec tof the invention is to provide a welding machine of the just outlined characteristics wherein the distribution of upsetting pressures is more uniform than in convenitonal welding machines of which we are aware at this time.

A further object of the invention is to provide a machine which is especially suited for flash or butt welding of large workpieces and which is constructed and assembled in such a way that the means which applies upsetting pressures to the butt-ended sections of workpieces may be rapidly moved to and from its operative position.

With the above objects in view, the invention resides in the provision of a resistance welding machine which is especially suited for welding of workpieces whose sections are butt-ended together. The machine comprises a stationary work supporting member or block which is provided with first work holding means adapted to clamp one section of a workpiece, a second work supporting member or block which is provided with second work holding means adapted to clamp the other section of the workpiece and which is reciprocable with respect to the stationary supporting member in a straight path between a first position in which the sections clamped by the respective work holding means are spaced apart and a second position in which the sections are butt-ended together at the welding station of the machine, and guide means for the second supporting member. This guide means comprises a plurality of tie rods fixed to the stationary supporting member and slidably supporting the second supporting member. In accordance with an advantageous feature of our invention, the tie rods are parallel with the path of the second supporting member and are arranged symmetrically with respect to the welding station. For example, if the machine comprises two tie rods, one thereof may be located at a level above and the other is then located at a level below the welding station.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 1:
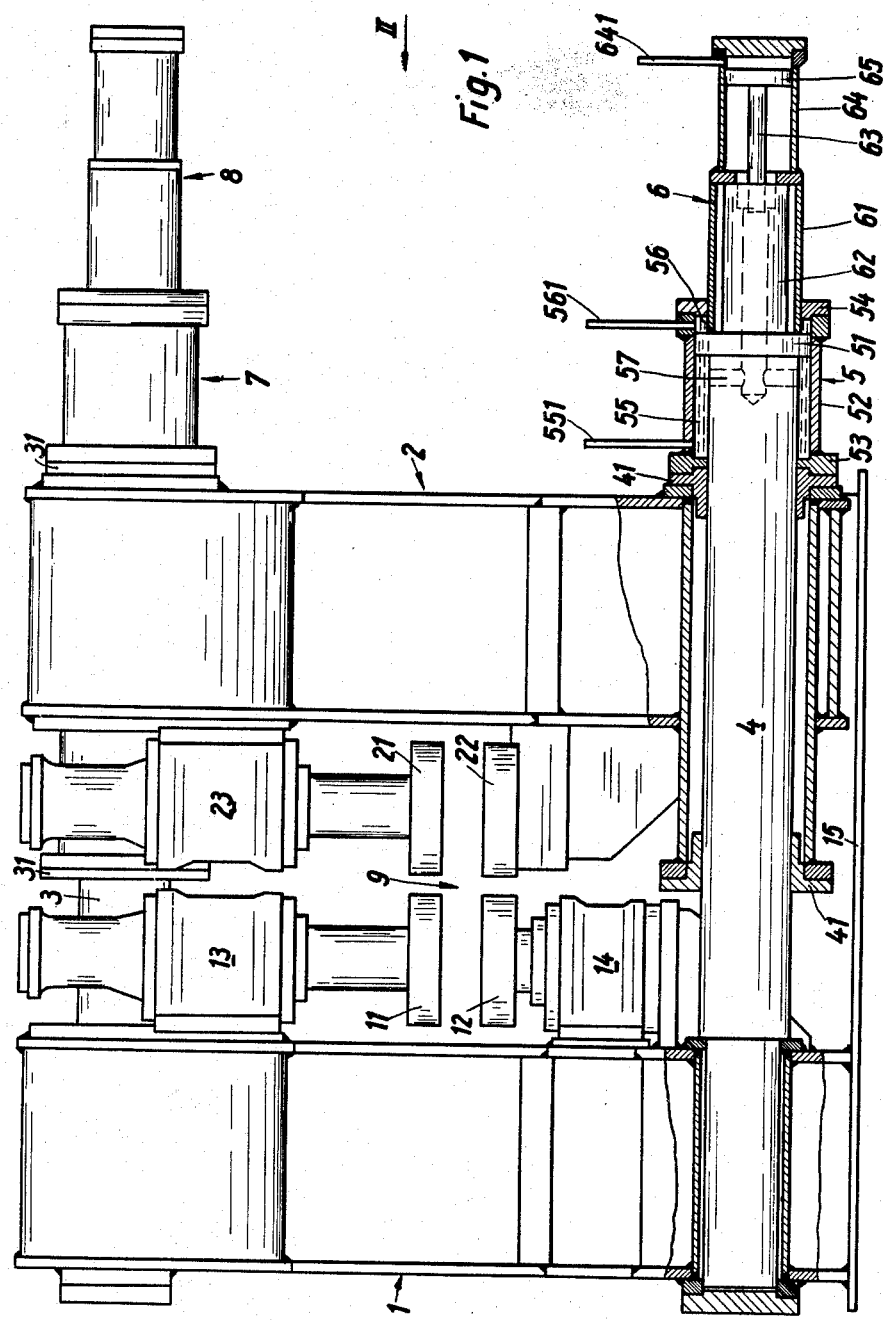
FIG. 1 is a partly elevational and partly sectional view of a welding machine which embodies our invention.
Figure 2:
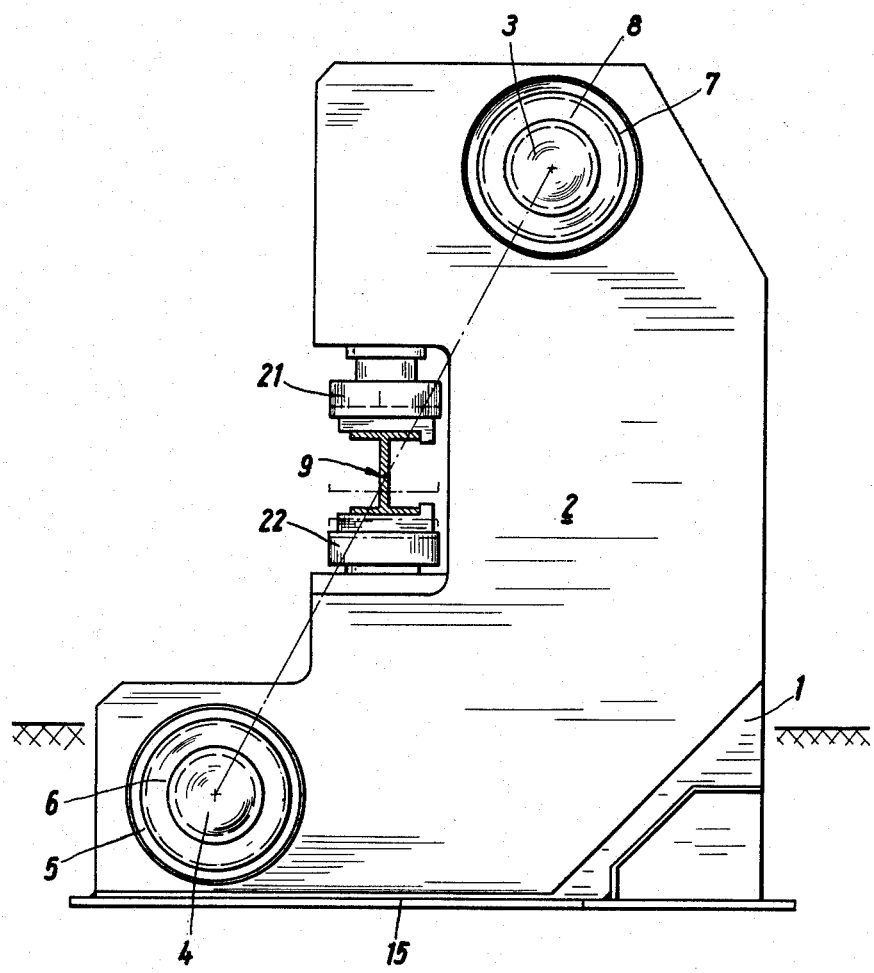
FIG. 2 is an end view of the machine as seen in the direction of arrow II in FIG. 1.

Referring now in greater detail to the illustrated embodiment, and first to FIGS. 1 and 2, there is shown a flash or butt welding machine which comprises a stationary work supporting member here shown as a block 1 which is rigid with the base or bed 15 of the welding machine and which supports a pair of cooperating clamping members including an upper clamping die 11 and a lower clamping die 12. These dies are respectivley reciprocable by hydraulic cylinders 13, 14 and the parts 11–14 together constitute a work holding means of the type as disclosed, for example, in U.S. Patent No. 2,875,718. The purpose of the dies 11, 12 is to firmly clamp one section of a workpiece, such as a profiled beam A which is indicated in FIG. 1 by phantom lines. The work holding means 11–14 is capable of adjusting the position of the section A without releasing the section.

The welding machine further comprises a second work supporting member or block 2 for a fixed lower die 22 and for an upper die 21 which is reciprocable by a hydraulic cylinder 23 so as to move toward or away from the die 21. The parts 21–23 together constitute a second work holding means which serves to clamp a second profiled section B at the time this second section is moved into abutment with the section A and at the time the end face of this second section is pressed against the adjacent end face of the section A.

In accordance with our invention, the second work supporting member 2 is movable in a straight horizontal path along a horizontal guide means here shown as including two elongated tie rods 3, 4 each of which has one of its end portions (3a, 4a) anchored in the stationary supporting member 1. The end portions 3a, 4a are insulated from the supporting member 1 by means of suitable washers, sleeves or the like. As shown in FIG. 1, the second work supporting member 2 comprises two spaced horizontal sleeves 2a, 2b whose ends are respectively provided with slide rings 31, 41 and these rings are respectively slidably along the tie rods 3 and 4 to prevent wobbling of the second supporting member. The axes of the tie rods 3, 4 are parallel with the path of the second supporting member, i.e., with the direction in which the second supporting member may transmit upsetting pressure to the sections A and B, and it will be noted that the tie rods 3, 4 are arranged symmetrically with respect to a welding station 9 at which the sections A, B are butt-ended together. Thus, the tie rod 3 is located at a level above and the tie rod 4 is located at a level below the welding station 9, and the line 9a connecting the axes of the rods 3, 4 constitutes the diameter of a circle whose center coincides with the center of the welding station and whose periphery passes through the axes of the tie rods.

The right-hand end portion of the tie rod 4, as viewed in FIG. 1, is rigidly connected with a double-acting piston 51 which is reciprocable in an advancing cylinder 52. This piston 51 and the advancing cylinder 52 together constitute an advancing means 5 for the second supporting member, and it will be noted that one end of the advancing cylinder 52 is rigidly fixed to the supporting member 2 by a ring 53 which is coaxially secured to the right-hand slide ring 41, as viewed in FIG. 1. The other end of the advancing cylinder 52 carries a ring 54 into which is telescoped a sleeve 61 forming part of a pressure generating means 6 which applies upsetting pressure to the sections A, B once the advancing means 5 causes the supporting member 2 to assume a predetermined position in which the section B is butt-ended together with the section A. The sleeve 61 accommodates a high-pressure cylinder 62 which is rigidly secured to the piston 51 and whose internal space 62a communicates with the left-hand chamber 55 of the cylinder 52 through a channel 57, the latter passing through the piston 51 and having radially extending portions machined into the material of the right-hand end portion of the tie rod 4.

The right-hand portion of the high-pressure cylinder 62 receives one end of a plunger 63 which is connected to a piston member 65 reciprocable in a low-pressure cylinder 64. This cylinder is rigid with the sleeve 61 and its right-hand chamber 64a communicates with a conduit 641. The piston member 65 and its cylinder 64 constitute a shifting means for the plunger 63.

Figure 3:
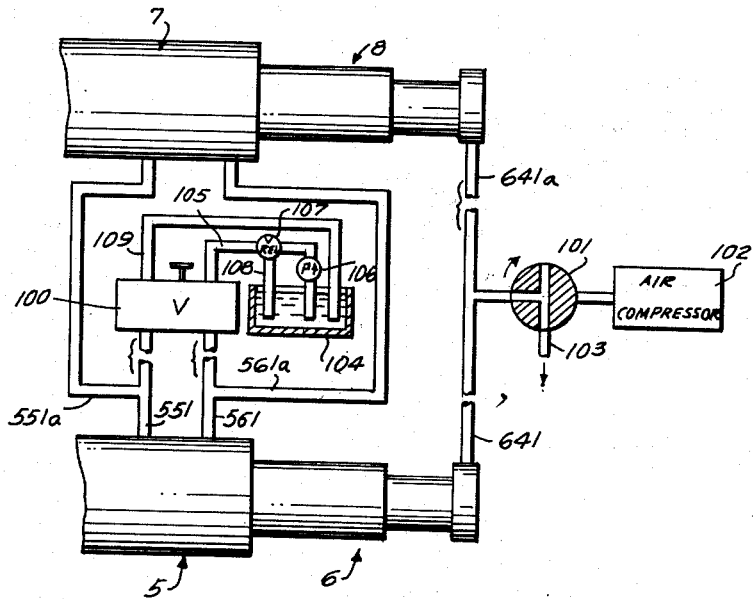
FIG. 3 is a schematic view of two control systems for the welding machine of FIGS. 1 and 2.

The chambers 55, 56 of the cylinder 52 respectively communicate with conduits 551, 561 leading to a first control means including a distributor valve 100 which is shown in FIG. 3. These chambers are filled with a hydraulic pressure fluid, e.g., oil, and the same fluid fills the channel 57 as well as the internal space 62a of the high-pressure cylinder 62.

The welding machine of FIGS. 1 and 2 comprises a second advancing means 7 for the supporting member 2 and a second pressure generating means 8, both cooperating with the upper tie rod 3 in the same way as described in connection with the tie rod 4. The conduits 551a, 561a of the advancing means 7 respectively communicate with conduits 551, 561 and the conduit 641a of the pressure generating means 8 communicates with the conduit 641. As shown in FIG. 3, the conduits 641, 641a are connected to a second control means including a regulating valve 101 movable between two positions of adjustment in one of which the conduits 641, 641a receive compressed gas from a source 102 (such as a suitable air compressor) and in the other of which the conduits 641, 641a communicate with the atmosphere through an outlet 103.

The first control means of the welding machine further comprises a source 104 of liquid (such as a suitable oil tank) which is connected with the distributor valve 100 by a supply conduit 105 containing a pump 106 and a pressure relief valve 107, the latter being adapted to return pressure fluid to the tank 104 (conduit 108) when the pressure prevailing at the downstream side of the pump 106 reaches a predetermined value. The construction of the valve 100 is such that it connects the conduits 551, 551a with the conduit 105 when the conduits 561, 561a communicate with a return line 109, or vice versa. In addition, the valve 100 may assume an intermediate position in which it prevents outflow of pressure fluid from the conduits 551, 551a while permitting pressure fluid to escape from the conduits 561, 561a and while simultaneously sealing the conduits 551, 551a from the supply conduit 105.

The electric circuit of the welding machine forms no part of this invention and, therefore, need not be shown in the drawings.

The machine of FIGS. 1 to 3 is operated as follows:

It is assumed that the section A is already clamped between the dies 11, 12 of the work holding means on the stationary supporting member 1, that the section B is already clamped between the dies 21, 22 of the work holding means on the second supporting member 2, and that the supporting member 2 assumes an inoperative position in which it is spaced from the supporting member 1, i.e., that the valve 100 admits pressure fluid to the chamber 56 of the advancing means 5 and to the corresponding chamber of the advancing means 7 so that the ring 53 is in abutment with the piston 51. The conduits 551, 551a communicate with the return line 109.

The operator then adjusts the valve 100 in a sense to admit pressure fluid to the chamber 55 and to the corresponding chamber of the advancing means 7 while permitting the conduits 561, 561a to communicate with the return line 109. The second supporting member 2 then begins to move along the tie rods 3, 4 toward and into the operative position of FIG. 1. In the next step, the valve 100 is adjusted to assume the aforementioned intermediate position in which the conduits 551, 551a are sealed from the supply conduit 105 and from the return line 109 whereas the latter is free to communicate with the conduits 561, 561a. At the same time, the valve 101 is adjusted in a sense to admit compressed gas into the conduits 641, 641a whereby the piston member 65 and the corresponding piston member of the pressure generating means 8 begin to move in a direction to the left, as viewed in FIG. 1, so as to compel the plunger 63 to penetrate into the internal space 62a of the high-pressure cylinder 62 whereby the liquid filling the chamber 55 subjects the supporting member 2 to very high upsetting pressure which is transmitted to the sections A, B and which acts to upset the butt-ended sections when their abutting faces are heated to the extent necessary to insure the formation of a satisfactory joint.

The piston member of the pressure generating means 8 exerts a similar pressure upon the fluid contained in the left-hand chamber of the advancing cylinder forming part of the advancing means 7. It will be noted that the piston member 65 and the plunger 63 together constitute a differential piston whose function is to advance the plunger 63 in response to comparatively low pressure of a gas admitted into the chamber 64a. It is desirable to insure that the fluid contained in the right-hand chamber 56 of the advancing means 5 is free to escape to the tank 104 with little throttling in order to insure that requisite upsetting pressure may be generated with little delay. In other words, the conduits 561, 561a, the valve 100 and the return line 109 should offer little resistance to flow of spent fluid from the chamber 56 and from the corresponding chamber of the advancing means 7.

When the welding operation is completed, the valve 100 is adjusted in a sense to connect the conduits 551, 551a with the tank 104 and to admit pressure fluid into the conduits 561, 561a whereby the second supporting member 2 begins to move away from the stationary supporting member 1 while its rings 31, 41 merely slide along the respective tie rods. The valve 100 is adjusted simultaneously with the valve 101 which then connects the conduits 641, 641a with the outlet 103 so that fluid contained in the high-pressure cylinder 62 automatically returns the piston member 65 to the position of FIG. 1, i.e., toward the right-hand end of the low-pressure cylinder 64. Of course, the piston member forming part of the pressure generating means 8 performs a similar return stroke because the conduit 641a then communicates with the atmosphere. In other words, the advancing means 5, 7 and the pressure generating means 6, 8 operate in synchronism because the conduits 551, 561, 641 respectively communicate with the conduits 551a, 561a, 641a.

An important advantage of the improved welding machine is that the tie rods 3, 4 are subjected to pure tensioning stresses, i.e., to stresses which act in the axial directions thereof. Thus, when the machine applies an upsetting pressure, the fluid filling the chamber 55 tends to move the piston 51 in a direction to the right, as viewed in FIG. 1, without subjecting the tie rod 4 to any bending or twisting stresses. Therefore, the rings 41 are not subjected to any appreciable stresses at the time the machine is called upon to apply an upsetting pressure, i.e., these rings must take up only the weight of the second supporting member 2 and of the section B. Furthermore, the construction of the guide means for the supporting member 2 is one of utmost simplicity.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a resistance welding machine, particularly in a machine in which two sections of a workpiece are butt-ended together, in combination, a stationary supporting member including first work holding means adapted to clamp one section of the workpiece; a second supporting member including second work holding means adapted to clamp the other section of the workpiece, said supporting members defining between themselves a welding station and said second supporting member being movable with respect to said stationary supporting member in a straight path between a first position in which the sections clamped by the respective work holding means are spaced apart and a second position in which the sections are butt-ended together at said welding station; guide means for said second supporting member, said guide means comprising a plurality of tie rods each having a first end portion fixed to said stationary supporting member and each slidably supporting said second supporting member, said tie rods being parallel with said path and being arranged symmetrically with respect to said welding station and each thereof having a free second end portion extending beyond said supporting member so that said second supporting member is located between said stationary supporting member and said free second end portions; and advancing means provided on said second end portions for advancing said second supporting member, said advancing means comprising a double-acting piston fixed to the second end portion of the respective tie rod, an advancing cylinder fixed to said second supporting member and reciprocably receiving the respective piston, each of said advancing cylinders defining a pair of internal chambers disposed at the opposite sides of the respective piston, a source of pressure fluid, control means for selectively admitting pressure fluid to said chambers so that said second supporting member is moved toward said stationary supporting member when one of said chambers receives pressure fluid and that said second supporting member is moved away from said stationary supporting member when the other chamber receives pressure fluid, and pressure generating means, one for each of said tie rods, for applying upsetting pressure to the butt end sections of the workpiece when said second supporting member assumes said second position, each of said pressure generating means comprising a high pressure cylinder rigid with the second end portion of the respective tie rod and defining an internal space communicating with the one chamber of the respective advancing cylinder, a plunger reciprocable in said internal space, and shifting means for moving said plunger to thereby increase the pressure within said one chamber when the plunger is moved in a direction to displace the fluid in said space.

2. A combination as set forth in claim 1, wherein each of said shifting means comprises a piston member connected with the respective plunger, a low-pressure cylinder rigid with the respective high-pressure cylinder, a second source of pressure fluid, and second control means for selectively admitting second pressure fluid into said low-pressure cylinders.

3. A combination as set forth in claim 2, wherein said first fluid is a liquid and wherein said second fluid is a gas.

4. A combination as set forth in claim 2, wherein each plunger and the respective piston member together constitute a differential piston.

5. The combination as set forth in claim 1, wherein the second end portion of each tie rod is provided with a bore having one end opening into the internal space defined by the corresponding high-pressure cylinder and the other end opening into said one chamber of the respective advancing cylinder, whereby said space and said chamber communicate with each other.

References Cited by the Examiner

UNITED STATES PATENTS

| | | | |
|---|---|---|---|
| 2,525,862 | 10/50 | Carpenter et al. | 219—101 |
| 2,892,914 | 6/59 | Rudd | 219—101 X |
| 3,065,536 | 11/62 | Chapman | 219—101 X |

RICHARD M. WOOD, *Primary Examiner.*